(12) United States Patent
Coulson et al.

(10) Patent No.: US 7,233,880 B2
(45) Date of Patent: Jun. 19, 2007

(54) ADAPTIVE CACHE ALGORITHM FOR TEMPERATURE SENSITIVE MEMORY

(75) Inventors: Richard L. Coulson, Portland, OR (US); Brian A. Leete, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 237 days.

(21) Appl. No.: 10/660,310

(22) Filed: Sep. 11, 2003

(65) Prior Publication Data

US 2005/0060126 A1   Mar. 17, 2005

(51) Int. Cl.
G06F 11/30 (2006.01)
(52) U.S. Cl. ............... 702/186; 711/142; 711/143
(58) Field of Classification Search ............... 702/186, 702/80, 183, 185; 395/750.061; 364/707; 711/100–113, 142–143; 324/76.61, 211; 345/557

See application file for complete search history.

(56) References Cited

U.S. PATENT DOCUMENTS

| | | | | |
|---|---|---|---|---|
| 5,091,846 A | * | 2/1992 | Sachs et al. | 711/130 |
| 5,155,843 A | * | 10/1992 | Stamm et al. | 714/5 |
| 5,524,212 A | * | 6/1996 | Somani et al. | 711/121 |
| 5,524,234 A | * | 6/1996 | Martinez et al. | 711/141 |
| 5,598,395 A | * | 1/1997 | Watanabe | 369/53.12 |
| 5,608,892 A | * | 3/1997 | Wakerly | 711/118 |
| 5,664,149 A | * | 9/1997 | Martinez et al. | 711/141 |
| 5,719,800 A | * | 2/1998 | Mittal et al. | 713/321 |
| 5,815,648 A | * | 9/1998 | Giovannetti | 714/5 |
| 5,860,111 A | * | 1/1999 | Martinez et al. | 711/143 |
| 5,870,616 A | * | 2/1999 | Loper et al. | 713/324 |
| 5,875,466 A | * | 2/1999 | Wakerly | 711/138 |
| 5,974,438 A | * | 10/1999 | Neufeld | 718/104 |
| 6,029,006 A | * | 2/2000 | Alexander et al. | 713/323 |
| 6,088,799 A | * | 7/2000 | Morgan et al. | 713/182 |
| 6,470,289 B1 | * | 10/2002 | Peters et al. | 702/132 |
| 6,662,136 B2 | * | 12/2003 | Lamb et al. | 702/132 |
| 6,725,342 B1 | * | 4/2004 | Coulson | 711/141 |
| 6,941,423 B2 | * | 9/2005 | Coulson | 711/141 |
| 6,970,985 B2 | * | 11/2005 | Moritz | 711/154 |
| 2005/0073869 A1 | * | 4/2005 | Gudesen et al. | 365/145 |

FOREIGN PATENT DOCUMENTS

| | | |
|---|---|---|
| EP | 0 606 779 A2 | 7/1994 |
| EP | 1 182 552 A2 | 2/2002 |
| WO | WO 2004/025658 * | 9/2003 |
| WO | WO 2004/025658 A1 * | 3/2004 |

\* cited by examiner

*Primary Examiner*—John Barlow
*Assistant Examiner*—Aditya S. Bhat
(74) *Attorney, Agent, or Firm*—Trop, Pruner & Hu, P.C.

(57) ABSTRACT

A temperature sensitive memory, such as a ferroelectric polymer memory, may be utilized as a disk cache memory in one embodiment. If the temperature begins to threaten shutdown, the memory may be transitioned from a write-back to a write-through cache memory. In such case, the system is ready for shutdown without the loss of critical data.

38 Claims, 2 Drawing Sheets

ADAPTIVE CACHE ALGORITHM FOR TEMPERATURE SENSITIVE MEMORY

BACKGROUND

This invention relates generally to electronic memories which may be sensitive to higher temperature environments.

In many cases, electronic memories may be subjected to higher temperature operating environments. For example, within a notebook or mobile personal computer, elevated temperatures may be encountered. Some types of memory may cease to function correctly at extended temperatures.

Ferroelectric polymer memory uses a polymer between a pair of electrodes. Ferroelectric polymer memories may be subject to voltage based disturbs at higher temperatures. At higher temperatures, a ferroelectric polymer memory may slow down its operation in order to function correctly.

This tendency to reduce speed at extended temperatures may complicate the operation of the system which relies on the ferroelectric polymer memory or other temperature sensitive memories. The slower data transfer rate may be unexpected by the rest of the system, since the remainder of the system may not be aware of the higher temperature conditions. Thus, the unexpected speed reduction may create unexpected problems in processor-based systems that rely on these memories, for example for caching purposes.

Thus, there is a need for a way to adapt processor-based systems to temperature sensitive memories.

DETAILED DESCRIPTION

Figure 1:
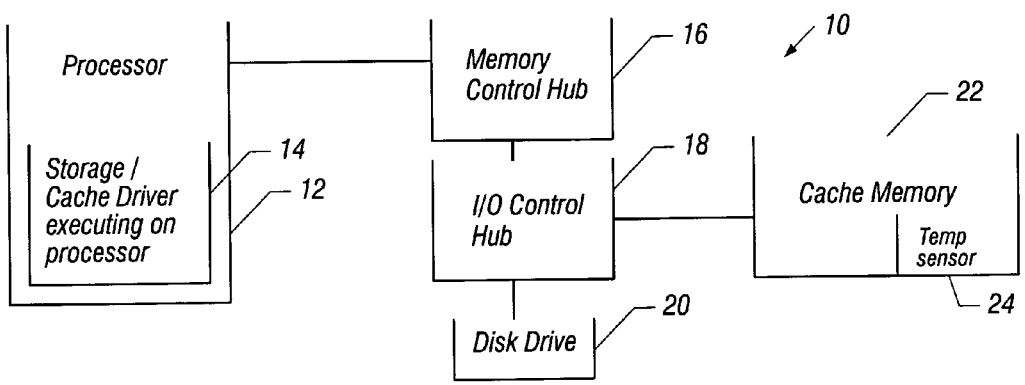
FIG. 1 is a schematic depiction of one embodiment of the present invention.

Referring to FIG. 1, a processor-based system 10 may be any conventional processor-based system, including mobile systems that operate on battery power. Examples of mobile systems include laptop computers, personal digital assistants, digital cameras, and cellular telephones. However, the present invention may be applicable to any of a wide range of processor-based systems.

The system 10 may include a processor 12 coupled in one architecture to a memory control hub 16. The hub 16 may in turn be coupled to an input/output control hub 18 in that architecture. The input/output control hub 18 may be coupled to a disk drive 20 and a cache memory 22. The cache memory 22 may be temperature sensitive. As examples, the temperature sensitive cache memory may be a ferroelectric polymer memory or a flash memory.

The memory 22 may include a temperature sensor 24 in one embodiment of the present invention. The temperature sensor 24 may be a silicon diode formed on or integrated into the memory 22 in one embodiment.

Although a particular architecture is illustrated in FIG. 1, the present invention is dependent on no particular architecture. Thus, a wide variety of other processor-based architectures may be utilized in other embodiments.

The processor 12 may include a storage 14 that stores a cache driver 14 that executes on the processor 12. The cache driver 14 adapts the processor-based system 10 to the vagaries of the cache memory 22 and, particularly, to its temperature sensitivity. For example, in one embodiment, when the temperature rises, and the memory 22 has a slower data transfer rate, the cache driver 14 may enable the system to adapt. The driver 14 itself may adapt to make more optimal decisions about what data to cache and not cache based on its knowledge of the cache's current data rate in view of the detected temperature.

Whenever the driver 14 makes a request to the cache memory 22, a status code is returned. This status code includes whether the operation succeeded or failed, whether error correction was applied, how much was applied, and the cache's temperature environment.

Figure 2:
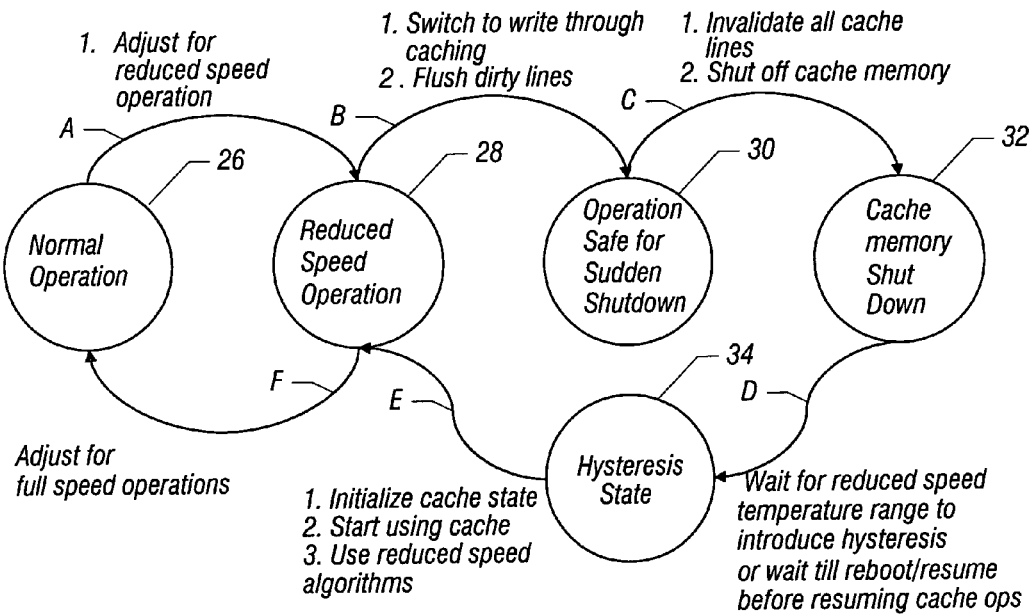
FIG. 2 is a state diagram for a cache driver in accordance with one embodiment of the present invention.

Referring to FIG. 2, normal operation is indicated at the state 26. In normal operation, the memory 22 may be a write-back cache. In a write-back cache, modifications to data in the cache are not copied to the disk drive 20 or other cache source and the cache simultaneously. In a write-through cache those changes may start to be written simultaneously, but since the disk drive is much slower, the operation takes longer, and thus the performance is lower.

The system 10 transitions from the normal operation state 26, to a reduced speed operation state 28, for example when the cache memory 22 is exposed to an elevated temperature environment called the throttle temperature range. In one embodiment, the temperature sensor 24 may detect that a higher temperature environment has been encountered. This higher or throttle temperature environment may be a temperature in the range of 60 to 80° C. in an embodiment where the cache memory 22 is a ferroelectric polymer memory.

In this throttle temperature range, the cache memory 22 may be exposed to voltage disturbs if it does not reduce its data transfer rate. A voltage disturb is a voltage that causes data to be written incorrectly. The use of the memory 22 may be adjusted for reduced speed operation, if any, at state 28. For example, in one embodiment, the cache driver 14 may avoid operations like pre-fetching or other speculative data acquisitions that may necessitate higher data transfer rates than the cache memory 22 can currently support. Also, the timing of the control logic on the memory 22 may be slowed down.

From the reduced speed operation state 28, the system may transition to an operation safe for sudden shutdown state 30. This may occur when the temperature becomes even more elevated. In one embodiment, using a cache memory 22 that is a ferroelectric polymer memory, the state 30 may be encountered at a critical temperature of 80 to 85° C.

In the state 30, the system 10 switches to a write-through caching algorithm and dirty cache lines (i.e., those that have not been written to system memory) are flushed. The system 10 may be close to the upper temperature or shutoff temperature of the cache memory 22. Thus, the cache driver 14 software or its hardware equivalent, changes algorithms so that it can shut off at any time without compromising data integrity. The driver 14 may cause the memory 22 to operate as a write-through cache rather than a write-back cache so that there is no dirty data in the cache.

The next transition, to the cache shutdown state 32, may occur at a shut-off temperature of about 85° C. in the embodiment in which the cache memory 22 is a ferroelectric polymer memory. In this transition, cache lines may be invalidated and the cache memory 22 may be shut off.

The system 10 then waits for a reduced or critical temperature range to introduce hysteresis in state 34. Alternatively, the system may wait until a reboot/resume before resuming reduced speed cache operations. From the hysteresis state 34, the system 10 may transition back to reduced speed operation state 28 by initializing a cache state, beginning the use of the cache, and using reduced speed algorithms. In the reduced speed operation state 28, with reduced temperature, the system 10 may adjust the algorithm for full speed operations, eventually returning, as indicated at F, to the normal operation state 26 at the normal temperature range.

Transitions may be spurred by the temperature sensor 24 that provides the temperature information to the cache driver 14 to appropriately control the operation of the system 10. For example, in the transition A, the temperature sensor 24 may indicate a throttle temperature range through the cache driver 14. The transition B may be initiated in response to a critical temperature range and the transition C may be indicated in response to the detection of a shutoff temperature. The transition D may be the result of a status indication of a critical temperature. The transition E may be the result of a status indication of a throttle temperature range, while the transition F may result from a status indication of a normal temperature range.

When the temperature sensed by the temperature sensor 24 is rising, the cache memory 22 is switched to write-through caching, so if the temperature rises further, and cache memory 22 shutdown is necessary, it can be done without loss of data integrity. The cache memory 22 operates in a shutdown safe mode without dirty data in the cache. The critical range is set sufficiently below the shutdown temperature to allow margin for writing the dirty data before the temperature rises to shutdown.

If the temperature reaches the shutdown temperature, the cache memory 22 is no longer used. The contents of the cache memory 22 are invalidated so that, in case of a crash and recovery, it is clear that the contents of a cache memory 22 are invalid. As the temperature cools, there are two choices in some embodiments. Under one choice, the system 10 can wait until a reboot or resume to start up the cache memory 22 again. Alternatively, the system 10 can wait until the temperature is below the critical temperature. In either case, the cache memory 22 may be reinitialized and started from empty.

Figure 3:
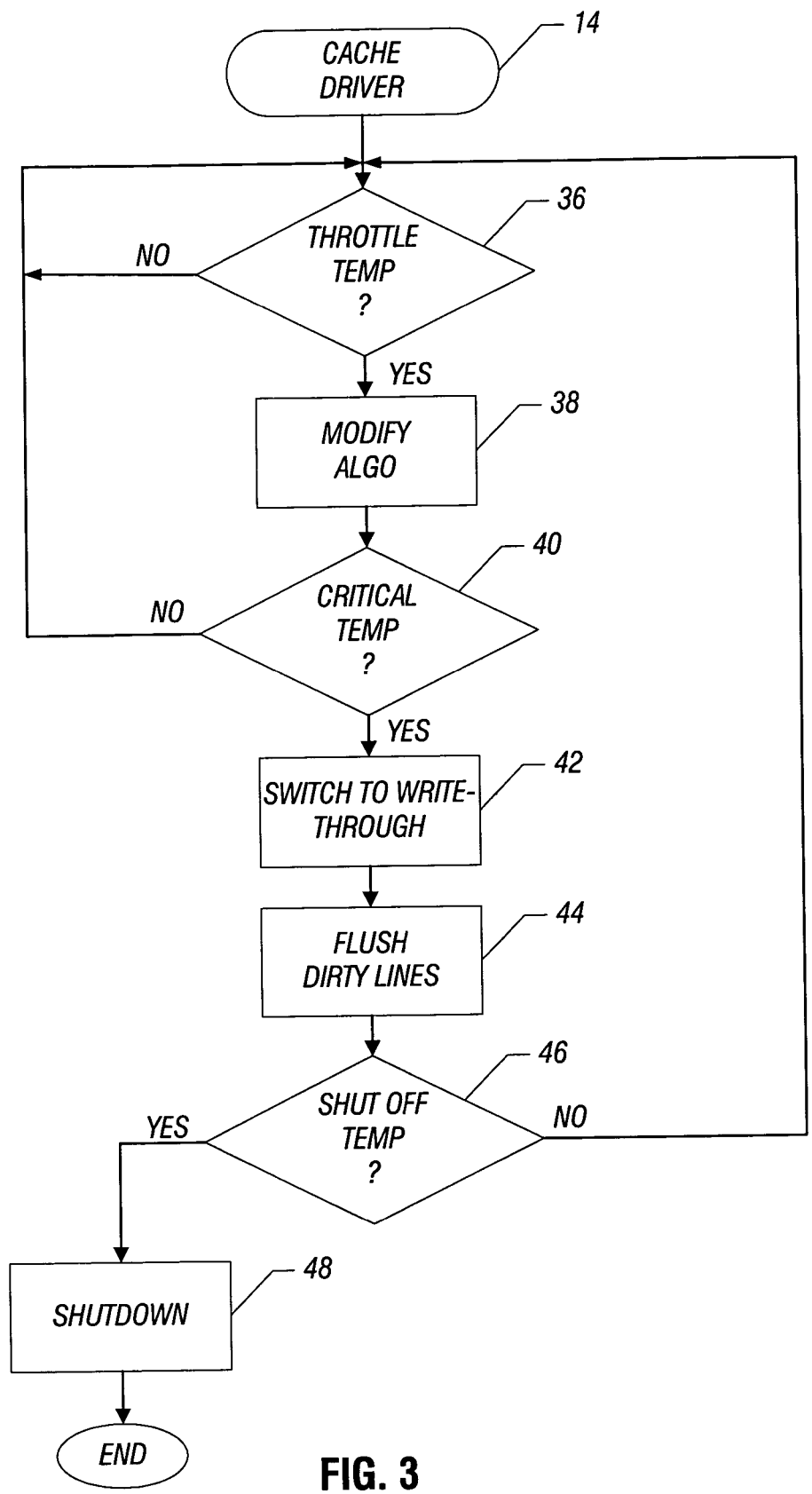
FIG. 3 is a flow chart for one embodiment of the present invention.

Referring to FIG. 3, the cache driver 14, in one embodiment, may initially check to determine whether the throttle temperature was exceeded as indicated in diamond 36. If so, the operation of either the cache memory 22, the cache driver 14, or other components of the system 10 may be modified to adapt to the slower speed operation of the cache memory 22 as indicated in block 38.

Next, a check at diamond 40 determines whether or not a critical temperature has been exceeded. If so, the cache memory 22 may be switched to operate as a write-through cache as indicated in block 42. Also, any dirty lines may be flushed as indicated in block 44.

Thereafter, the driver 14 monitors for the occurrence of a shutoff temperature as determined in diamond 46. If it is detected, the cache memory 22 may be shutdown as indicated in block 48. Thereafter, the memory 22 may transition back through a hysteresis state 34 to a reduced speed operation state 28, back to normal operation as shown in FIG. 2.

Thus, despite temperature sensitivity, some memories can be used as cache memories, for disk caching purposes for example, when the operating range is less than the possible temperatures experienced in real life usage. In one such case, the cache memory 22 may be utilized as a disk cache to cache information read off the disk drive 20.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
monitoring a temperature of a cache memory;
adjusting the operation of a system using said memory at a first temperature; and
in response to the detection of a higher, second temperature, transitioning the cache memory from a write-back cache to a write-through cache.

2. The method of claim 1 including monitoring the temperature of a ferroelectric polymer cache memory.

3. The method of claim 1 including slowing an operation of said system at said first temperature.

4. The method of claim 1 including reducing pre-fetching at said first temperature.

5. The method of claim 1 including adjusting what data is cached based on the detection of said first temperature.

6. The method of claim 1 including shutting off the said cache memory at a temperature above said second temperature.

7. The method of claim 6 including monitoring for a temperature lower than said second temperature.

8. The method of claim 7 including, upon detecting a lower temperature, resuming operation of said cache memory.

9. The method of claim 7 including waiting for a power cycle before resuming cache operations.

10. The method of claim 6 including shutting off said cache memory and invalidating cache lines in said cache memory.

11. The method of claim 1 including flushing a cache line in said cache memory that has not been written through to a source memory.

12. An article comprising a medium storing instructions that, if executed, enable a processor-based system to:
monitor a temperature of a cache memory;
adjust the operation of a system using said memory at a first temperature; and
in response to the detection of a higher, second temperature, transitioning the cache memory from a write-back cache to a write-through cache.

13. The article of claim 12 further storing instructions that, if executed, enable a processor-based system to monitor the temperature of a ferroelectric polymer cache memory.

14. The article of claim 12 further storing instructions that, if executed, enable a processor-based system to shut off the said cache memory at a temperature above said second temperature.

15. The article of claim 12 further storing instructions that, if executed, enable a processor-based system to flush a cache line in said cache memory that has not been written through to a source memory.

16. The article of claim 15 further storing instructions that, if executed, enable a processor-based system to monitor for a temperature lower than said second temperature.

17. The article of claim 16 further storing instructions that, if executed, enable a processor-based system to resume operation of said cache memory upon detecting a lower temperature.

18. The article of claim 16 further storing instructions that, if executed, enable a processor-based system to wait for a power cycle before resuming cache operations.

19. The article of claim 14 further storing instructions that, if executed, enable a processor-based system to shut off the cache and invalidate all the cache lines.

20. The article of claim 12 further storing instructions that, if executed, enable a processor-based system to reduce the speed of operations at said second temperature.

21. The article of claim 12 further storing instructions that, if executed, enable a processor-based system to reduce pre-fetching at said second temperature.

22. The article of claim 12 further storing instructions that, if executed, enable a processor-based system to adjust the caching of data based on the detection of said second temperature.

23. A processor-based system comprising:
a processor;
a disk drive coupled to said processor;
a cache memory coupled said processor; and
a storage to store a cache driver to monitor a temperature of said cache memory and adjusting the operation of a system using said memory at a first temperature and, in response to the detection of a higher, second temperature, transitioning the cache memory from a write-back cache to a write-through cache.

24. The system of claim 23 wherein said cache memory is a ferroelectric polymer cache memory.

25. The system of claim 23 wherein said cache memory is a flash memory.

26. The system of claim 23 wherein said storage stores instructions that enable dirty lines to be flushed.

27. The system of claim 23 wherein said storage stores instructions that enable the system to adjust for reduced speed operation at a first temperature, switch to a write-through cache memory at a second higher temperature, and invalidate cache lines and shut off the cache memory at still a higher temperature.

28. The system of claim 27, said storage further storing instructions that enable the cache memory to return to full speed operation.

29. The system of claim 27 wherein said storage stores instructions that enable the system to wait for reduced speed temperature range to resume cache operations after shutting off the cache memory in response to a temperature condition.

30. The system of claim 27 wherein said storage stores instructions that enable the system to resume cache operations after shutting off the cache memory in response to a cache condition by initially resuming reduced speed operations in a first stage and thereafter resuming normal operations.

31. The system of claim 23 wherein said cache memory includes a temperature sensor.

32. A circuit comprising:
a component to receive an indication of a first temperature of a cache memory and to develop a signal to transition the cache memory from a write-back cache to a write-through cache in response to said temperature indication, said component to receive an indication of a second temperature, lower than said first temperature, and to develop a signal to vary the operation of a system to adjust for the temperature affected operation of said cache memory.

33. The circuit of claim 32 wherein said component to adjust a caching operation of the system in response to a temperature indication from said memory.

34. The circuit of claim 32 wherein said component to shut off said cache in response to a temperature indication.

35. The circuit of claim 34 wherein said component to invalidate a cache line in said cache memory.

36. The circuit of claim 32 including a cache memory.

37. The circuit of claim 36 including a ferroelectric polymer memory.

38. The circuit of claim 36 wherein said cache memory includes a temperature sensor.

* * * * *